(12) United States Patent
Kori et al.

(10) Patent No.: US 7,369,883 B2
(45) Date of Patent: May 6, 2008

(54) RADIO COMMUNICATION DEVICE

(75) Inventors: Katsushige Kori, Kato (JP); Kenji Yagi, Kato (JP); Yoshito Fukata, Kato (JP); Youichi Kitagishi, Kawasaki (JP); Masaharu Tosa, Kato (JP)

(73) Assignee: Fujitsu Limited, Kawasaki (JP)

( * ) Notice: Subject to any disclaimer, the term of this patent is extended or adjusted under 35 U.S.C. 154(b) by 393 days.

(21) Appl. No.: 10/939,595

(22) Filed: Sep. 14, 2004

(65) Prior Publication Data

US 2005/0227634 A1 Oct. 13, 2005

(30) Foreign Application Priority Data

Apr. 8, 2004 (JP) ............................. 2004-114600

(51) Int. Cl.
*H04B 1/03* (2006.01)
*H04B 1/08* (2006.01)

(52) U.S. Cl. .................................. 455/575.3; 455/90.3

(58) Field of Classification Search ...... 455/90.1–90.3, 455/575.3

See application file for complete search history.

(56) References Cited

U.S. PATENT DOCUMENTS

| | | | |
|---|---|---|---|
| 6,442,400 B1 * | 8/2002 | Ying et al. ............... | 455/552.1 |
| 7,010,334 B2 * | 3/2006 | Saito ....................... | 455/575.7 |
| 7,079,877 B2 * | 7/2006 | Shoji et al. .............. | 455/575.5 |
| 7,082,324 B2 * | 7/2006 | Sawamura ............... | 455/575.3 |
| 2004/0198417 A1 * | 10/2004 | Yoda ....................... | 455/550.1 |
| 2004/0203529 A1 * | 10/2004 | Hong et al. .............. | 455/90.3 |
| 2004/0259608 A1 * | 12/2004 | Huang et al. ............ | 455/575.3 |

FOREIGN PATENT DOCUMENTS

JP 2003-8320 1/2003

* cited by examiner

*Primary Examiner*—Philip J. Sobutka
(74) *Attorney, Agent, or Firm*—Westerman, Hattori, Daniels & Adrian, LLP.

(57) ABSTRACT

A radio communication device comprises an upper housing and a lower housing connected by a hinge part to be mutually rotatable. A connection portion electrically connects a first circuit board in the upper housing and a second circuit board in the lower housing each other. An antenna is provided in the lower housing and has a base, an electric supply terminal and a ground terminal. An antenna electric supply part is provided to supply an operating current from the second circuit board to the antenna. A position of the antenna electric supply part is shifted from a central position of the second circuit board in an axial direction of the hinge part to increase a distance from the connection portion, and the electric supply terminal and the ground terminal are extended from the antenna base in the hinge part axial direction to contact the antenna electric supply part.

7 Claims, 10 Drawing Sheets

RADIO COMMUNICATION DEVICE

CROSS-REFERENCE TO RELATED APPLICATIONS

This application is based upon and claims the benefit of priority from the prior Japanese application No. 2004-114600, filed on Apr. 8, 2004, the entire contents of which are herein incorporated by reference.

BACKGROUND OF THE INVENTION

1. Field of the Invention

The present invention generally relates to a collapsible type radio communication device in which the antenna is built in the interior of the housing, and the upper housing and the lower housing are connected by the hinge part so that they are mutually rotatable.

2. Description of the Related Art

In a collapsible type portable telephone which is a kind of the structure of the portable telephone, the upper housing and the lower housing are connected by the hinge part so that they are mutually rotatable around the hinge part. The collapsible portable telephone is provided so that the upper housing can be opened and closed to the lower housing.

The portable telephone of the collapsible type provides the advantageous features in that the upper housing can be equipped with a large-sized display screen, that the composition when the upper housing is opened makes use of the telephone easy, and that the slim structure when the upper housing is closed to the lower housing is convenient to carry.

In a conventional portable telephone of the collapsible type, the projection type antenna arranged in the lower housing or the projection type antenna arranged in the upper housing is used.

Generally, the helical antenna or the extendable monopole antenna is used as the projection type antenna, and the antenna portion projects from the housing. The projection type antenna provides the advantageous feature in that the antenna gain can be made high in a condition that the user holds the portable telephone by hand.

However, with the projection type antenna, there is the problem that the antenna portion projecting from the telephone housing is obstructive when taking out the portable telephone from the user's pocket on the occasion of use.

On the other hand, as the antenna built in the housing of the collapsible portable telephone, the strip line antenna and the hinge-part built-in type antenna are known. Moreover, the flip-part built-in type antennas, such as the coil-like antenna and the micro strip line antenna, are also known.

Since there is no portion which projects from the housing according to such built-in antennas, the problem like the problem of the projection type antenna does not arise with such built-in antennas.

For example, Japanese Laid-Open Patent Application No. 2003-008320 discloses a collapsible portable telephone which uses the hinge-part built-in type antenna.

In this portable telephone, the hinge-part built-in type antenna is arranged at a position which is adjacent to the hinge part connecting the upper housing and the lower housing, and overlaps the upper part of the flexible wiring board.

FIG. 1 shows the outline composition on the front side of a conventional portable telephone. FIG. 2 shows the outline composition on the back side of the conventional portable telephone.

As shown in FIG. 1 and FIG. 2, the conventional portable telephone 1 is of the collapsible type, and comprises the upper case 2 and the upper cover 11 which attach the display unit, such as the liquid-crystal-display unit, to the upper case surface, the lower cover 4 and the lower case 12 which attach the key operation unit including ten keys, various function keys, etc., to the lower case surface, and the hinge part 3 and the hinge part 5 which connect the upper case 2 and the lower cover 4 to be mutually rotatable around the hinge parts.

By assembling the portable telephone 1, the upper case 2 and the upper cover 11 form the upper housing of the portable telephone 1, and the lower cover 4 and the lower case 12 form the lower housing of the portable telephone 1.

The upper housing circuit board 6 for attaching the various electric parts including the display unit is provided in the upper housing of the portable telephone 1, and the back surface (for the sake of convenience, the surface shown in FIG. 2 will be called the back surface) of the upper housing circuit board 6 is protected by the upper cover 11.

The lower housing circuit board 7 for attaching the various electric parts including the key operation unit is provided in the lower housing of the portable telephone 1, and the back surface (the surface shown in FIG. 2 will be called the back surface) of the lower housing circuit board 7 is protected by the lower cover 4.

The hinge part 3 is formed integrally with the upper case 2, and the hinge part 5 is formed integrally with the lower cover 4. Moreover, the hinge parts are formed integrally with the upper cover 11 and the lower case 12, respectively. The upper cover 11 and the lower case 12 are provided so that they are mutually rotatable around the hinge parts. Therefore, the upper housing and the lower housing are provided so that they are mutually rotatable around the hinge parts.

The flexible wiring board 8 electrically connects the upper housing circuit board 6 and the lower housing circuit board 7 each other, and is arranged to extend from the upper housing circuit board 6 to the lower housing circuit board 7 through the hinge part 5.

The flexible wiring board 8 is formed of a flexible member. In order to accommodate the flexible wiring board 8 in a small space adjacent to the hinge part between the upper and lower housings, the flexible wiring board 8 is arranged in the state where it is wound once or more around the hinge part 5 in the middle of the flexible wiring board 8.

The antenna electric supply part 9 is arranged at the end of the lower housing circuit board 7 near the hinge part 5, generally in the center of the lower housing circuit board 7 along the axial direction of the hinge part.

The antenna 10 is provided at the end of the lower housing adjacent to the hinge part 5. The antenna 10 is formed of a sheet metal, and it is formed in a predetermined form so that sufficient antenna gain may be obtained.

The antenna 10 is arranged in the position contiguous to the flexible wiring board 8 in the lower case 12 so that the electric supply terminal and ground terminal which are prolonged from this antenna 10 may contact the antenna electric supply part 9.

The antenna 10 operates by the operating current supplied through the electric supply terminal from the antenna electric supply part 9 of the lower housing circuit board 7, and functions as an antenna for transmission and reception.

With the progress of the multiple functionality in the recent portable telephones, it is desirable to make the display unit of the upper housing as large as possible, and the key operation unit of the lower housing has restrictions in that it cannot be made much smaller from the viewpoint of operability.

Moreover, in the portable telephone of this kind of collapsible type, since it tends to be bulky when the thickness becomes thick as a whole and the upper housing and the lower housing are put into the pocket etc. in the state where it closed focusing on the hinge part, since the upper housing and lower housings overlap mutually, the slim structure of the portable telephone is desired.

On the other hand, the number of wirings, such as signal wires in the respective circuit boards provided in the upper and lower housings, tend to increase by the multiple functionality of the portable telephones, and adoption of the big drop of size.

Therefore, it is in the tendency for the numbers of wiring, such as signal wiring accommodated in the flexible wiring board formed in order to connect between the circuit boards of the upper and lower housings, to also increase.

Securing the increased number of wirings of this circuit board will bar the slim structure of the portable telephone of the collapsible type. That is, in order to satisfy the demand of thin structure, there are restrictions that width of the flexible wiring board of the securable for the internal space of the circuit board of the upper and lower housings can seldom be enlarged.

Moreover, in order to accommodate much signal wiring, when unavoidable, in order to have to form two or more flexible wiring boards in the space inside the upper and lower housings in piles, the subject that the slim structure of the portable telephone becomes difficult occurs.

FIG. 3 and FIG. 4 show the composition by the side of the surface of the conventional portable telephone in the state where it is folded down, and the back.

FIG. 5 shows the outline composition when removing the lower case in the portable telephone of FIG. 4.

As shown in FIG. 3, in order to accommodate the winding portion in the middle of the flexible wiring board 8 in a small space near the hinge part between the upper and lower housings in the conventional portable telephone 1, there are restrictions that making the width (indicated by the arrow B1 in FIG. 3) of the flexible wiring board 8 in the hinge part axial direction so much large is not allowed.

Moreover, the flexible wiring board 8 needs to be arranged so that it may not interfere with the antenna electric supply part 9 of the lower housing circuit board 7.

As shown in FIG. 4, the antenna 10 is arranged in the position contiguous to the flexible wiring board 8 in the lower case 12 so that the electric supply terminal 13 and the ground terminal 14 which are prolonged from the antenna 10 may contact the antenna electric supply part 9 of the lower housing circuit board 7.

As shown in FIG. 5, the electric parts which affect the antenna property at the time of operation of loudspeaker 15 grade besides the electric parts of the key operation unit are also attached in the lower housing circuit board 7.

The form of the antenna 10 which includes the pieces of metal, such as the copper and the aluminum, makes as small as possible influence which it has on the property of the antenna 10 by the electric parts on the lower housing circuit board 7, and it needs to be constituted so that sufficient antenna gain may be obtained.

Moreover, in consideration of the property of the antenna 10, it is necessary to opt for arrangement of the antenna electric supply part 9 in the lower housing circuit board 7.

As mentioned above, the number of wirings of the wiring circuit board carried in the portable telephone is in the tendency to increase in recent years, so the number of wirings of the flexible wiring board 8 also tends to increase. On the other hand, however, there is also the demand for the slim structure of the portable telephone.

In the conventional portable telephone of the collapsible type, in order to satisfy the demand for the slim structure, the problem in that it is difficult to take a large width of the flexible wiring board that can be provided in the internal space of the wiring circuit boards of the upper and lower housings arises.

SUMMARY OF THE INVENTION

An object of the present invention is to provide an improved radio communication device in which the above-mentioned problems are eliminated.

Another object of the present invention is to provide a radio communication device of the collapsible type which is provided with the antenna structure wherein the width of the flexible wiring board between the circuit boards of the upper and lower housings can be made large, and the slim structure to meet the increased number of wires of the circuit boards in the radio communication device is attained.

The above-mentioned objects of the present invention are achieved by a radio communication device comprising: an upper housing and a lower housing connected by a hinge part so that the upper and lower housings are mutually rotatable around the hinge part; a first circuit board provided in the upper housing and carrying first electric components; a second circuit board provided in the lower housing and carrying second electric components; a connection portion electrically connecting the first circuit board and the second circuit board each other; an antenna provided in the lower housing and having a base, an electric supply terminal and a ground terminal; and an antenna electric supply part provided at an end of the second circuit board near the hinge part to supply an operating current from the second circuit board to the antenna, wherein a position of the antenna electric supply part in the second circuit board is shifted from a central position of the second circuit board in an axial direction of the hinge part to increase a distance from the connection portion along the hinge part, and the electric supply terminal and the ground terminal of the antenna are extended from the base of the antenna in the hinge part axial direction to contact the antenna electric supply part the position of which is shifted.

According to the antenna structure of the radio communication device by the present invention, it is possible to respond to increase of the number of wires of the circuit board, such as the flexible wiring board arranged between the circuit boards of the upper and lower housings since the distance between the antenna electric supply part and the connection portion can be increased, and it is possible to attain the slim structure of the radio communication device by shifting and arranging the antenna electric supply part from the central position along the hinge part.

Moreover, the number of sheets of the flexible wiring board can be reduced, and the durability of the radio communication device can be improved.

BRIEF DESCRIPTION OF THE DRAWINGS

Other objects, features and advantages of the present invention will be apparent from the following detailed description when read in conjunction with the accompanying drawings.

DETAILED DESCRIPTION OF PREFERRED EMBODIMENTS

A description will now be given of the preferred embodiments of the present invention with reference to the accompanying drawings.

In the following, the radio communication device of the present invention includes portable telephones and portable electronic instruments, such as PDA, in which a communication card is built in or a hot-swappable communication card is attached thereto as the optional part.

Figure 9:
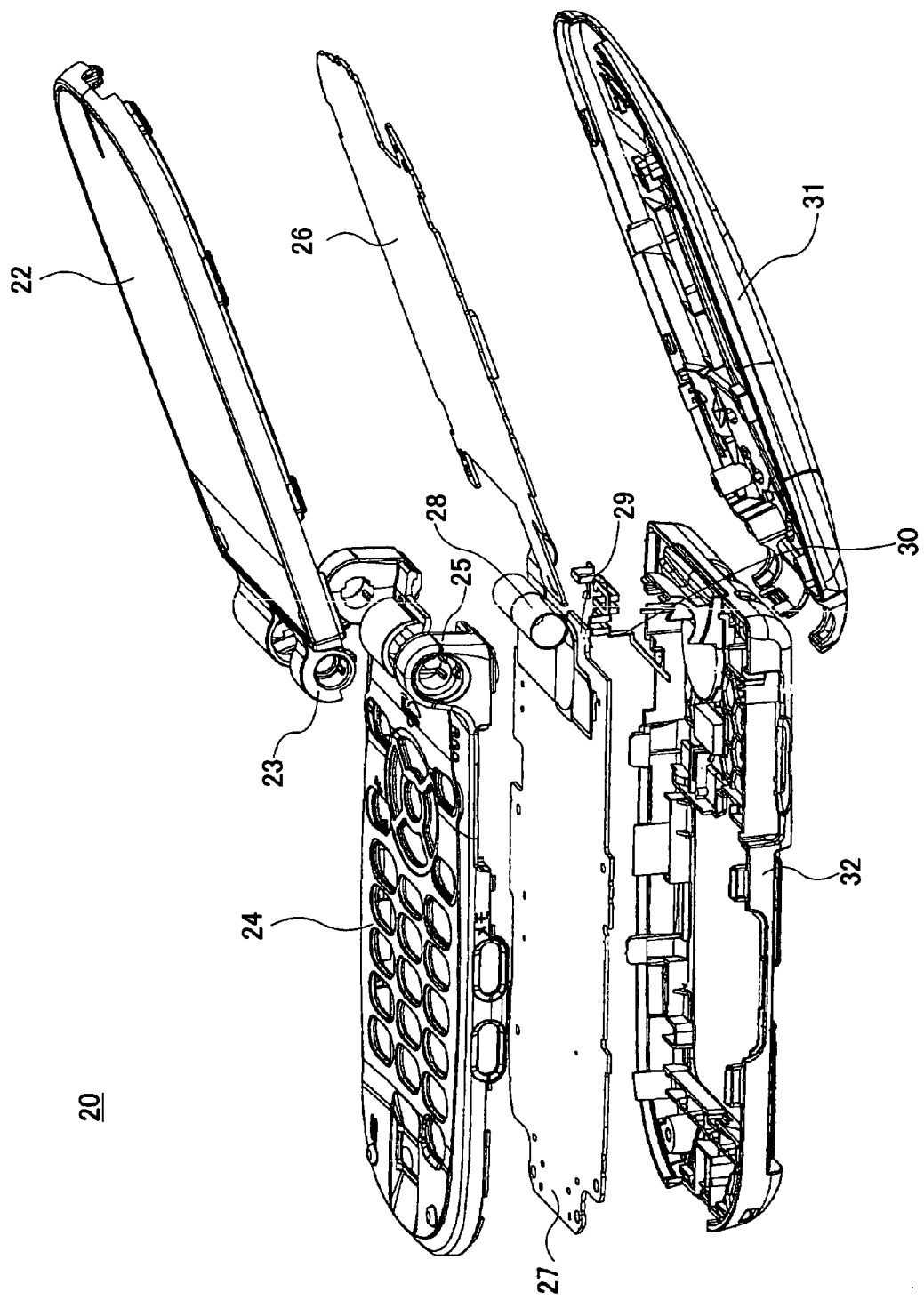
FIG. 9 is a perspective exploded view of the portable telephone in the preferred embodiment of the invention showing the outline composition on the front side of the portable telephone.
Figure 10:
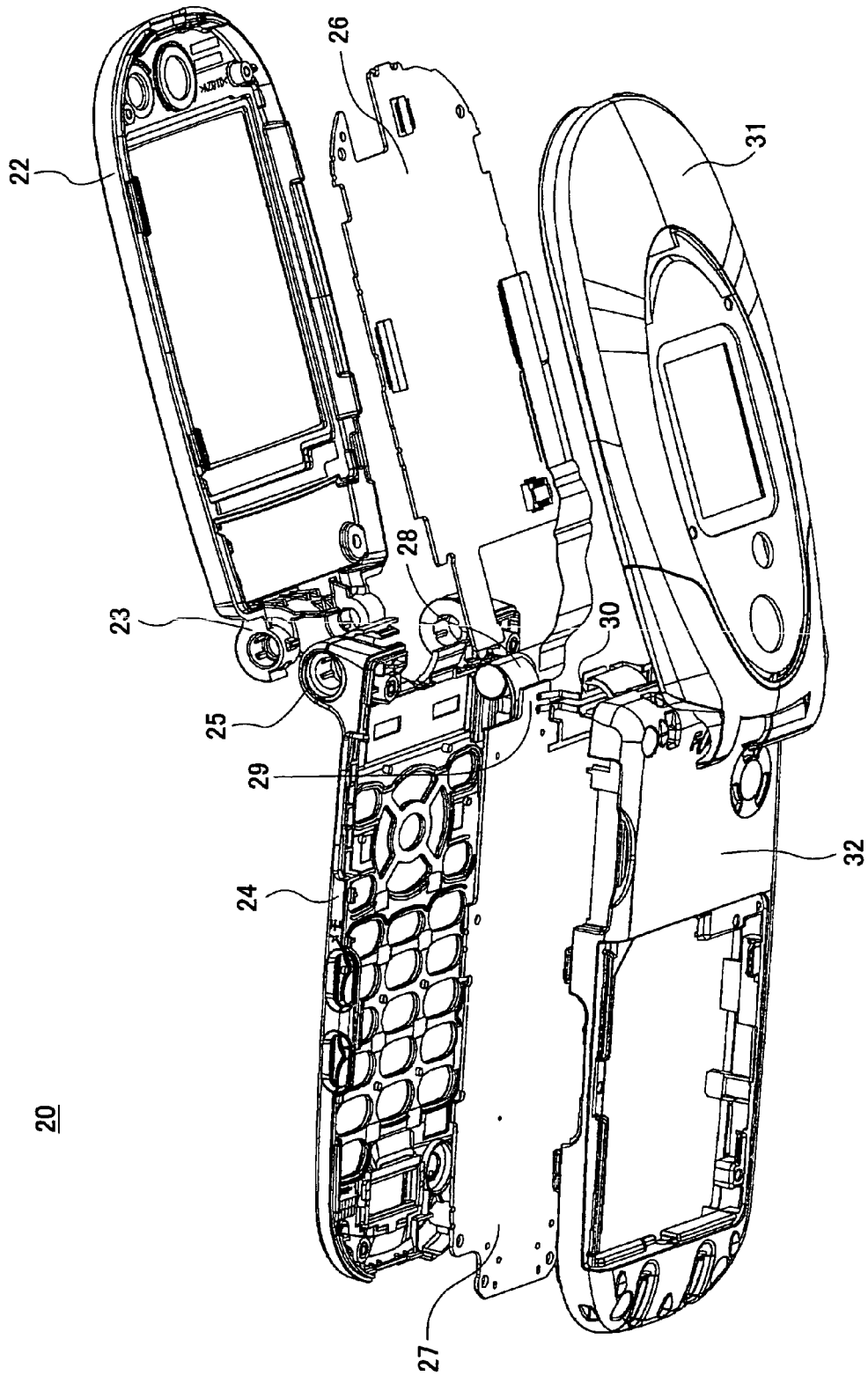
FIG. 10 is a perspective exploded view of the portable telephone in the preferred embodiment of the invention showing the outline composition on the back side of the portable telephone.

FIG. 9 shows the outline composition on the front side of the portable telephone in the preferred embodiment of the invention. FIG. 10 shows the outline composition on the back side of the portable telephone in the preferred embodiment of the invention.

As shown in FIG. 9 and FIG. 10, the portable telephone 20 of this embodiment is equipped with the hinge part 23 and the hinge part 25 which pivot mutually the upper case 22 for attaching the display unit like the liquid-crystal-display unit, in the surface and the upper cover 31, the lower cover 24 for attaching the key operation unit including the ten key, the various function keys, etc. in the surface and the lower case 32, the upper case 22, and the lower cover 24 to rotatable each other.

By assembling this portable telephone 20, the upper case 22 and the upper cover 31 form the upper housing of the portable telephone 20, and the lower cover 24 and the lower case 32 form the lower housing of the portable telephone 20.

The upper housing circuit board 26 for attaching the various electric parts including the display unit in the upper housing of the portable telephone 20 is built in, and the back side (the surface shown in FIG. 10 is called the back side for the sake of convenience) of the circuit board 26 is protected by the upper cover 31.

The lower housing circuit board 27 for attaching the various electric parts including the key operation unit in the lower housing is built in, and the back side (the surface shown in FIG. 10 is called the back side for the sake of convenience) of the circuit board 27 is protected by the lower case 32.

The hinge part 23 is formed integrally with the upper case 22, and the hinge part 25 is formed integrally with the lower cover 24.

Moreover, the hinge part is formed also in the upper cover 31 and the lower case 32 integrally, respectively, and the upper cover 31 comprises to rotatable each other to the lower case 32.

Therefore, the upper housing and the lower housing comprise to rotatable each other mutually by these hinge parts. The connection portion 28 connected mutually the upper housing circuit board 26 and the lower housing circuit board 27 electrically, and is prolonged ranging over the upper housing circuit board 26 and the lower housing circuit board 27 focusing on the hinge part 25.

The connection portion 28 is formed with the conductive flexible members. The connection portion 28 is constituted by, for example, the flexible wiring board, and is arranged to extend to the front surface of the lower housing circuit board 27 from the back surface of the upper housing circuit board 26 through the winding portion in the middle of the flexible wiring board.

Moreover, in order to contain to the small space of hinge circles between the upper and lower housings in this case, the central part of the flexible wiring board 28 is arranged in the state where it is wound once or more, and the winding portion in the middle of the flexible wiring board 28 is wrapped around the hinge part 25.

Figure 1:
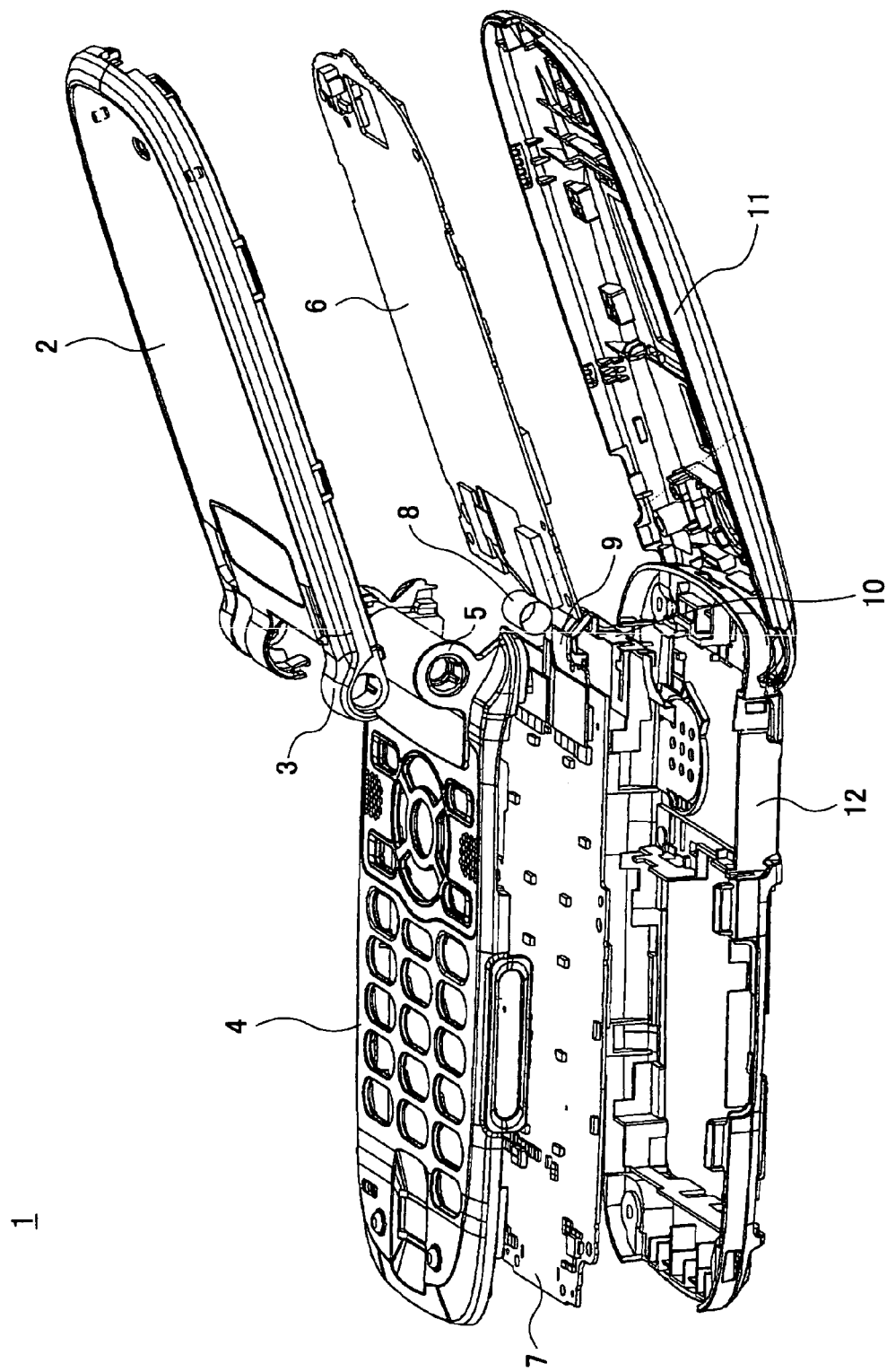
FIG. 1 is a perspective exploded view of a conventional portable telephone showing the outline composition on the front side of the conventional portable telephone.
Figure 2:
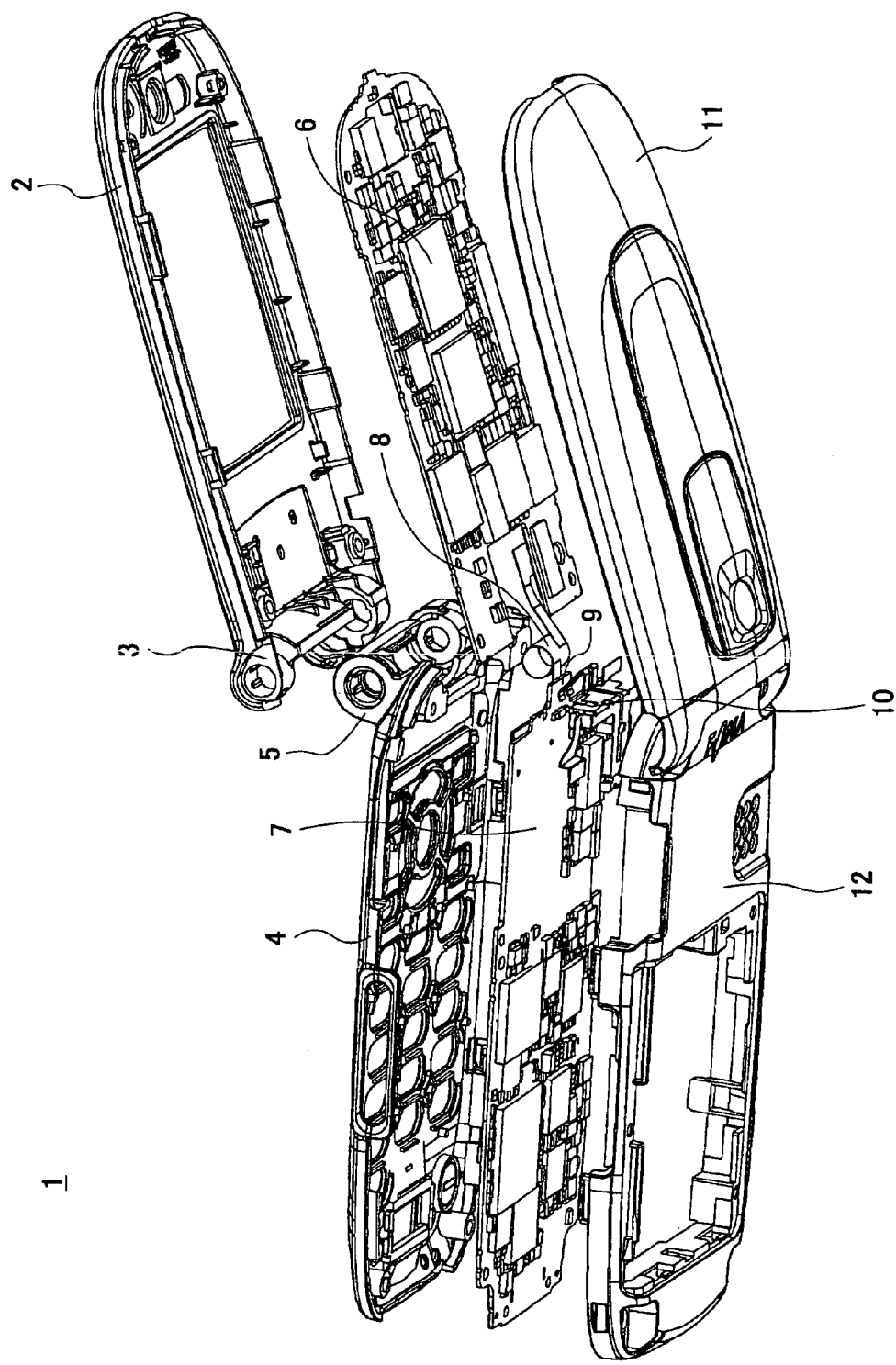
FIG. 2 is a perspective exploded view of the conventional portable telephone showing the outline composition on the back side of the conventional portable telephone.
Figure 3:
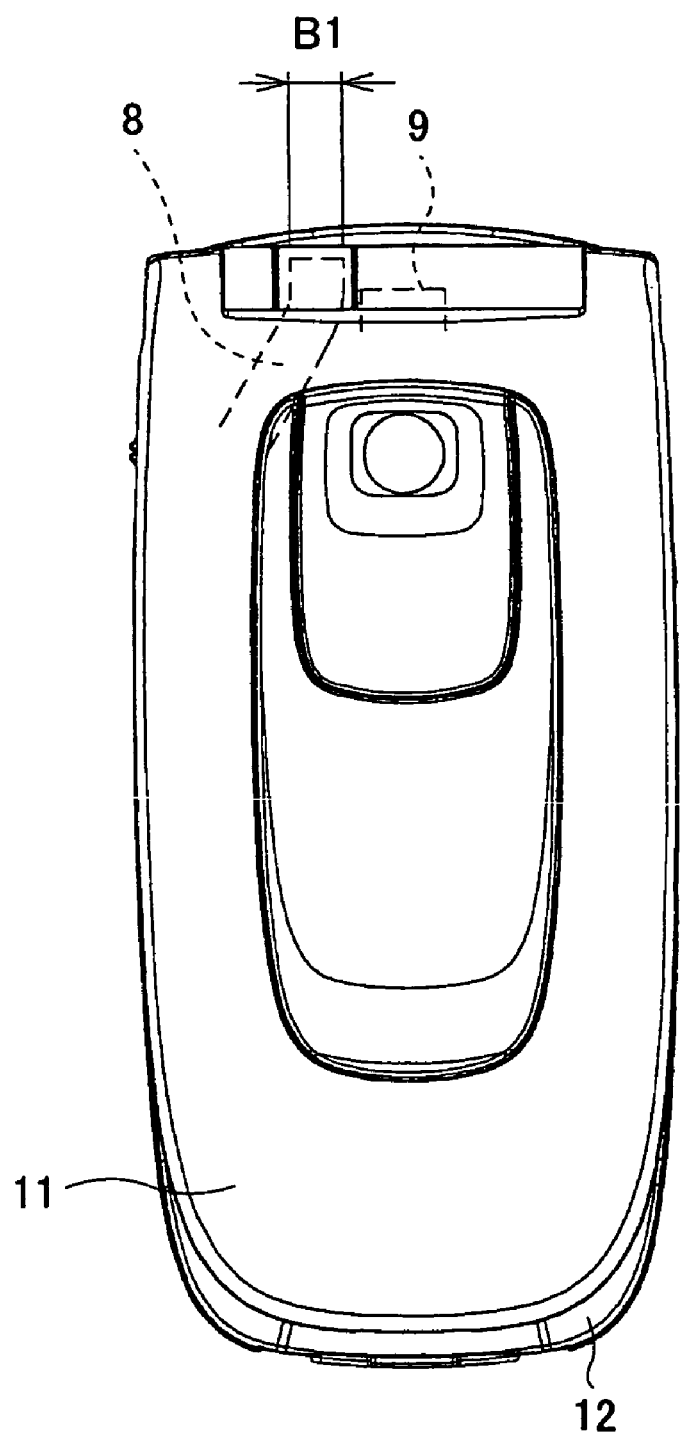
FIG. 3 is a diagram showing the composition on the front side of the conventional portable-telephone in the state where the upper housing is folded down.
Figure 4:
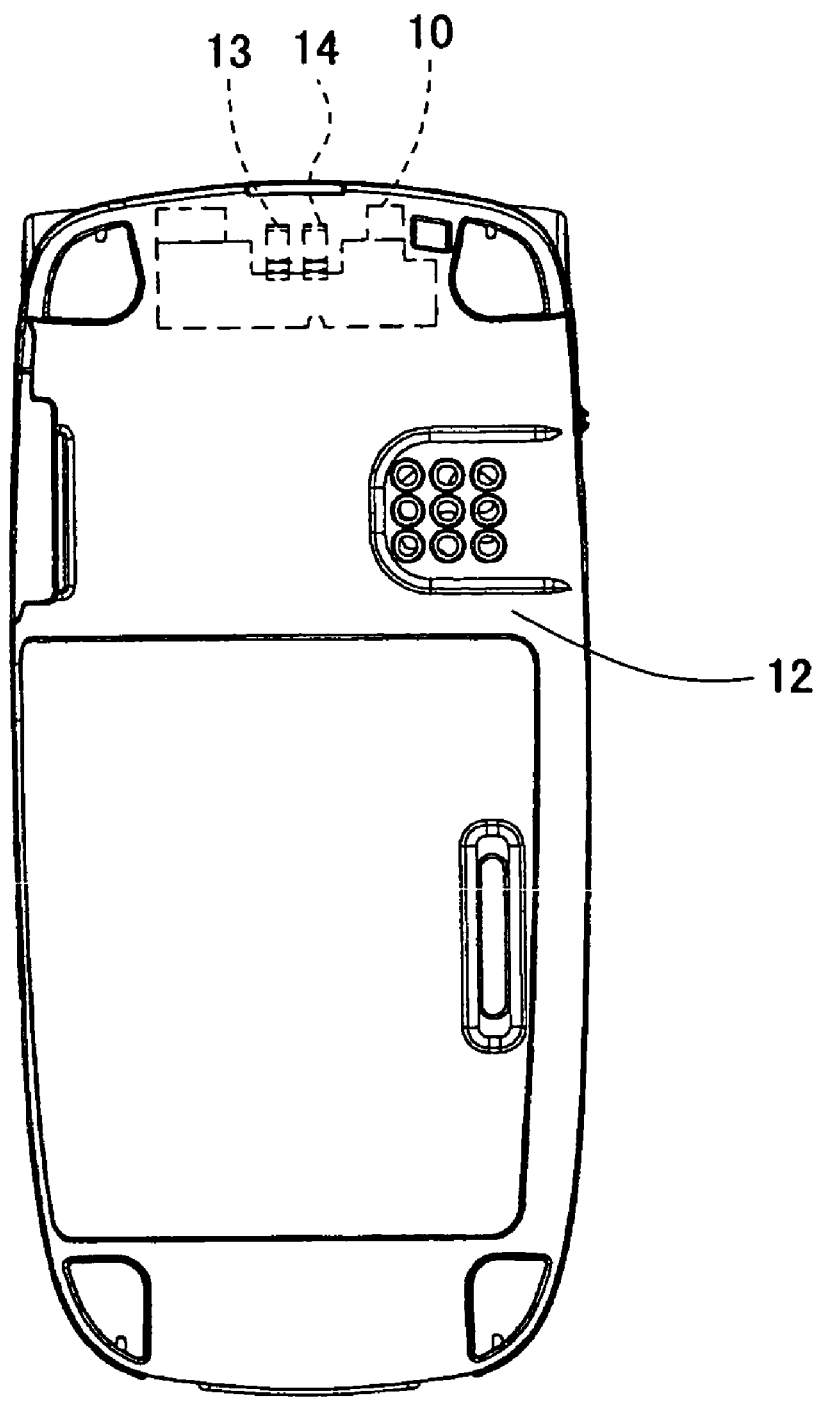
FIG. 4 is a diagram showing the composition on the back side of the conventional portable-telephone in the state where the upper housing is folded down.
Figure 5:
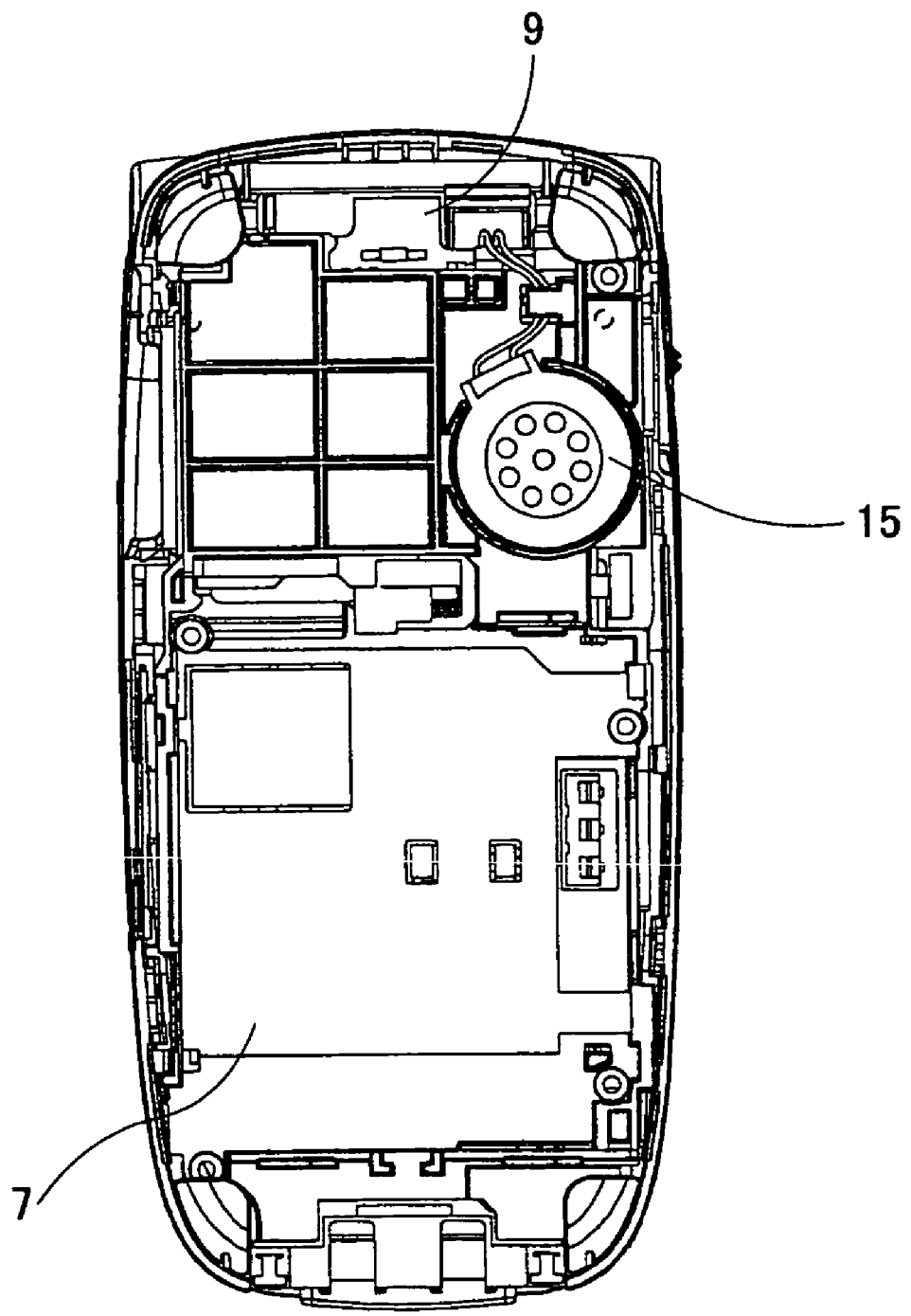
FIG. 5 is a diagram showing the outline composition when the lower case is removed from the conventional portable telephone of FIG. 4.

Next, the composition of the portable telephone 20 of the present embodiment is explained, comparing with the composition of the conventional portable telephone shown in FIG. 3 or FIG. 5.

Figure 6:
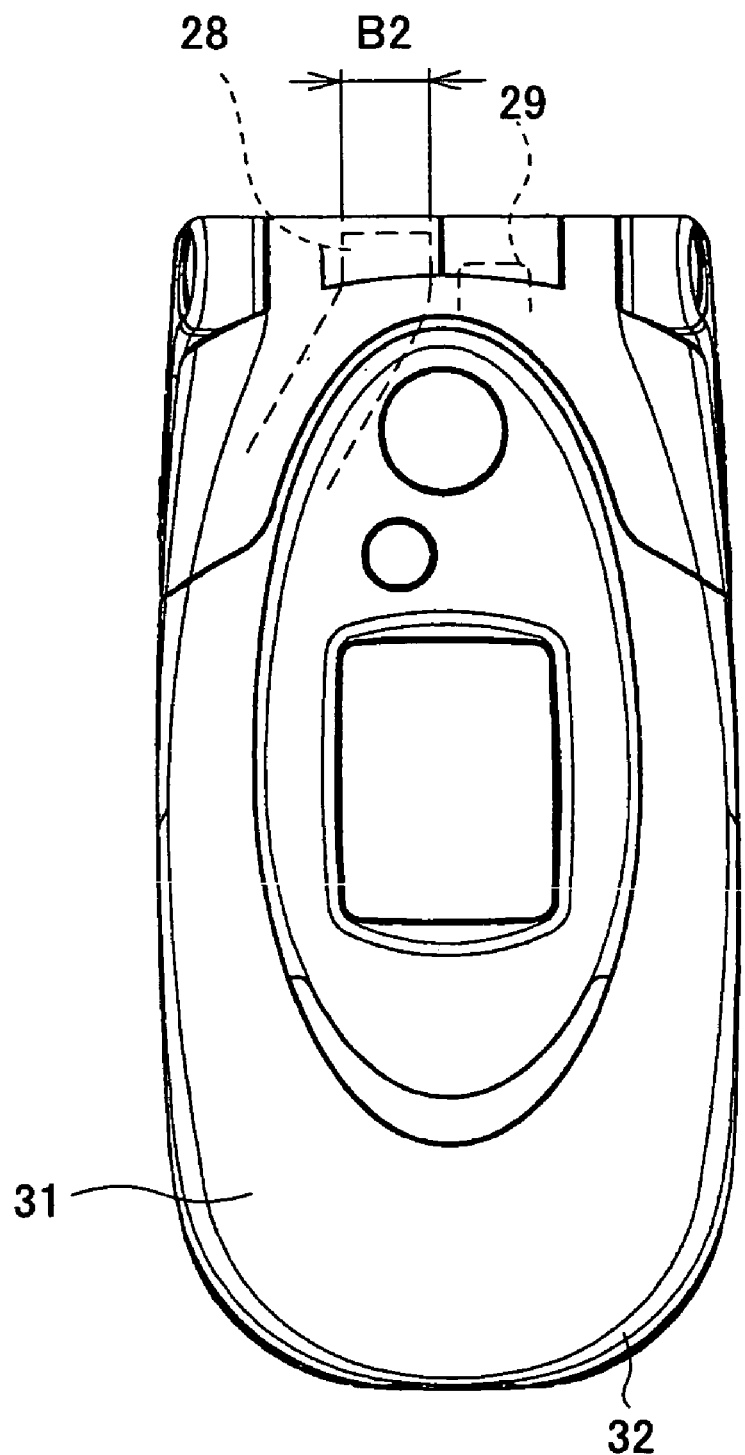
FIG. 6 is a diagram showing the composition on the front side of the portable telephone in the preferred embodiment of the invention in the state where the upper housing is folded down.

FIG. 6 shows the composition by the side of the portable-telephone surface in the embodiment of the present invention in the state where it is folded down.

Figure 7:
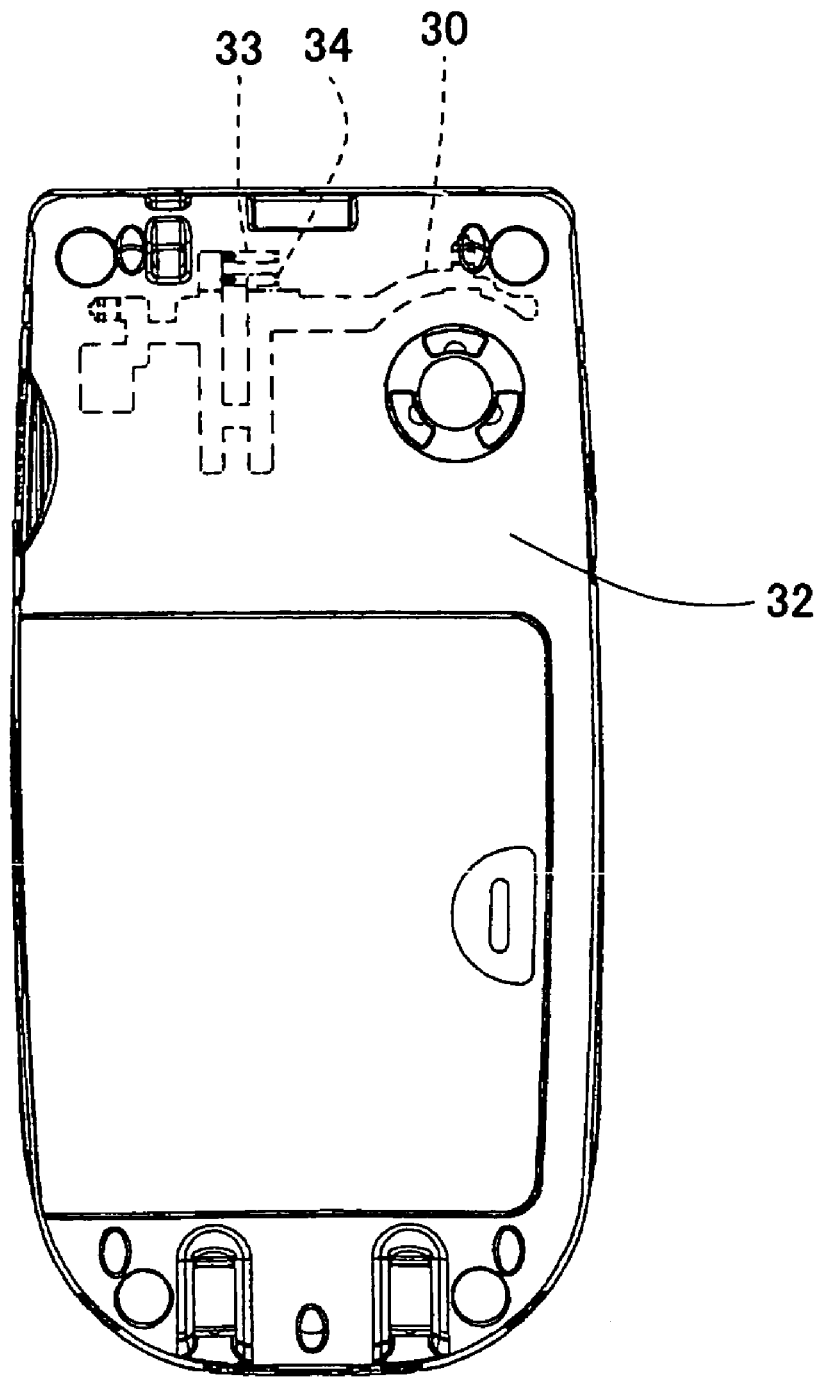
FIG. 7 is a diagram showing the composition on the back side of the portable-telephone in the preferred embodiment of the invention in the state where the upper housing is folded down.

FIG. 7 shows the composition by the side of the portable-telephone back in the embodiment of the present invention in the state where it is folded down.

Figure 8:
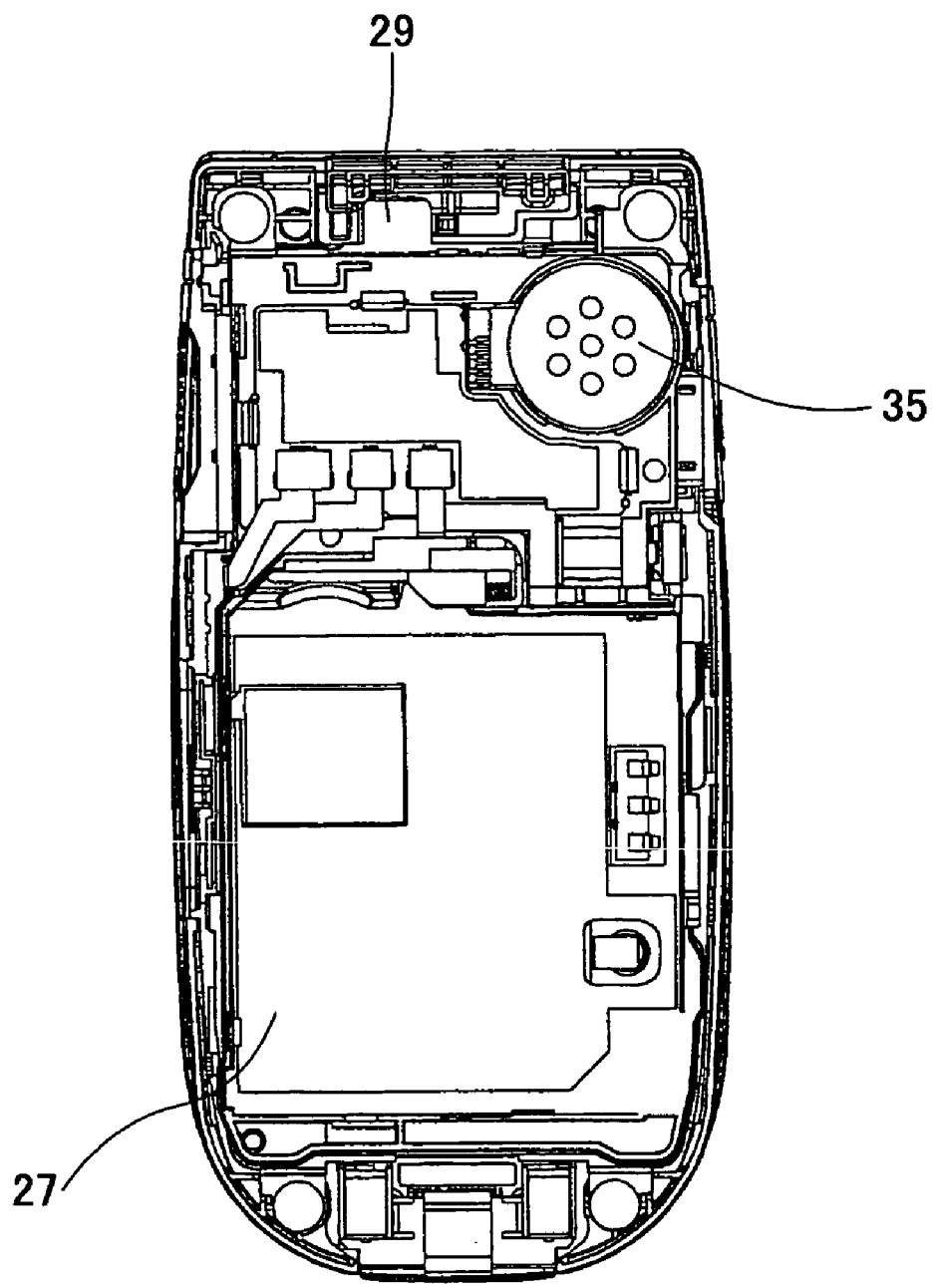
FIG. 8 is a diagram showing the outline composition when the lower case is removed from the portable telephone of FIG. 7.

FIG. 8 shows the outline composition when removing the lower case in the portable telephone of FIG. 7.

As shown in FIG. 8, the electric parts which affect the antenna property at the time of operation of loudspeaker 35 grade besides the electric parts of the key operation unit are also attached in the lower housing circuit board 27.

Generally rustproof processing is made by making the pieces of metal (right electric conduction object), such as copper, brass, and aluminum, into basis material, and the antenna 30 is constituted.

The form of the antenna 30 makes influence of the property on the antenna 30 by the electric parts on the lower housing circuit board 27 as small as possible, and it is formed so that sufficient antenna gain may be obtained.

In consideration of the property of such an antenna 30, the position in which the antenna electric supply part 29 in the lower housing circuit board 27 is formed is decided.

Unlike the antenna electric supply part 9 in the conventional example of FIG. 5 provided in the central position of the hinge part axial direction of the end of the lower housing circuit board 12, the antenna electric supply part 29 in the lower housing circuit board 27 of FIG. 8 is formed in the position separated to some extent from the central position in the end by the side of the hinge part 25 of the lower housing circuit board 27 to the connection portion 28 along the direction of hinge part 25 axis.

In the portable telephone 20 of the present embodiment, the position of the antenna electric supply part 29 in the lower housing circuit board 27 is selected at a portion where the antenna 30 would not interfere with the wiring portion, extending from a winding portion in the middle of the connection portion 28, to the circuit board 27.

Further, the antenna electric supply portion 29 is selectively positioned, where a portion of the antenna electric supply portion 29 connecting with the electric supply terminal 33 and the ground terminal 34 is slightly separated from any electric part, such as a loud speaker 35, that may affect a property of the antenna when the electric part is under operation.

As shown in FIG. 6, in the portable telephone 20 of the present embodiment, the width (width shown by arrow B-2 of FIG. 6) in the hinge part axial direction of the connection portion 28 can be set larger than the former by shifting and arranging the antenna electric supply part 29 of the lower housing circuit board 27 from the central position of the hinge part 25.

For this reason, since the multiple function of the portable telephone 20 is realized, it can respond to the increase in the numbers of wiring, such as signal wiring of the circuit boards 26 and 27 of the upper and lower housings.

As shown in FIG. 7, it is possible to contain the winding portion of the central part of the connection portion 28 to the small space of hinge circles between the upper and lower housings by shifting and arranging the position in which the electric supply terminal 33 and the ground terminal 34 which are prolonged along the direction of the axis of the hinge part 25 from the base of the antenna 30, and the antenna electric supply part 29 of the lower housing circuit board 27 are contacted from the central position of the hinge part.

Moreover, it is possible to arrange the connection portion 28 so that it may not interfere with the antenna electric supply part 29 of the lower housing circuit board 27.

Furthermore, as shown in FIG. 7, the antenna 30 is arranged in the position which adjoined the connection portion 28 in the lower case 32 so that the electric supply terminal 13 and the ground terminal 14 which are prolonged from the antenna 30 may contact.

In the portable telephone 20 of this preferred embodiment, the antenna electric supply part 29 is formed in the position separated from the central position in the end which adjoined the hinge part 25 of the lower housing circuit board 27 to the connection portion 28 along the direction of the axis of the hinge part 25 (see FIG. 6).

The antenna 30 is provided in the lower housing at the end of the lower housing circuit board 27 adjacent to the hinge part 25.

The antenna 30 operates by the operating current supplied through the electric supply terminal 33 from the antenna electric supply part 29 of the lower housing circuit board 27, and functions as an antenna for transmission and reception.

Rustproof processing is made by making the pieces of metal (right electric conduction object), such as copper, brass, and aluminum, into basis material, and the antenna 30 is constituted.

Since the RF flows the surface of the antenna 30 at the time of operation, if it can do, the surface of the piece of metal has that desirable in which the metal layer with electric conduction resistance small if possible like silver plating is formed.

Moreover, the antenna 30 is formed in predetermined form using the piece of metal so that sufficient antenna gain may be obtained (refer to FIG. 7).

In the present embodiment, the antenna 30 is arranged in an asymmetrical formation with respect to the centerline of the lower housing perpendicular to the axial direction of the hinge part 25, as shown in FIG. 7

For example, the antenna 30 in the present embodiment includes the electric supply terminal 33 and the ground terminal 34, which follow an upper part of an L-shaped base of the antenna 30 having a double row, and which contact the feeding point of the antenna electric supply part 29 back.

It includes the first arm portion prolonged in the direction of left-hand side of the base (it sets at the back shown in FIG. 7, and is the direction of left-hand side), and the second arm portion prolonged in the direction of right-hand side of the base (it is the direction of right-hand side to the back shown in FIG. 7).

The first arm portion the base are formed in the same height position and has the straight line portion prolonged in the direction which intersects perpendicularly in the direction of the axis of the hinge part 25, and the second arm portion is formed in the height position lower than the base, and has the straight line portion prolonged in the direction parallel to the direction of the axis of the hinge part 25.

However, although it is possible for it not to be limited only to the form of FIG. 7, and to change variously, as for the form of the antenna 30, it is desirable to satisfy the terms and conditions of the position in which the position relation with the electric parts on the lower housing circuit board 27, the position relation with the antenna electric supply part 29, and the transceiver property of the antenna are not reduced.

In the portable telephone 20 of this preferred embodiment, it moves to the position shifted in the connection portion 28 and the opposite direction in the back of the lower housing circuit board 27, and the base of the antenna 30 is arranged so that the electric supply terminal 33 and the ground terminal 34 which are prolonged along the direction of the axis of the hinge part 25 from the base of the antenna 30 may contact the back of the antenna electric supply part 29.

Namely, the base of the antenna 30 is shifted and arranged in the connection portion 28 and the opposite direction about the centerline of the lower housing.

The antenna electric supply part 29 central position is located at the end which adjoined the hinge part 25 of the lower housing circuit board 27.

It is provided in the position left to the connection portion 28 along the direction of the axis of the hinge part 25 and the electric supply terminal 33 and the ground terminal 34 of the antenna 30.

It is extended along the direction of the axis of the hinge part 25 from the base of the antenna 30 of the position shifted the account of the top, and it is arranged so that the back of the antenna electric supply part 28 may be contacted.

Therefore, it is possible to make larger than the case of the conventional example width which met in the hinge part axial direction of the flexible wiring board provided between the circuit boards of the upper and lower housings, and it can respond to increase of the number of wiring of the circuit board.

According to the portable telephone 20 of the present embodiment, since width of the flexible wiring board can be enlarged, even if the number of wiring of the circuit board of the upper and lower housings increases, it is not necessary to form two or more flexible wiring boards in piles, and the durability of the flexible wiring board itself can be improved.

The present invention is not limited to the above-described embodiments, and variations and modifications may be made without departing from the scope of the present invention.

For example, in the above-described embodiments, the portable telephone has been explained as a typical example of the radio communication device. However, the present invention is not limited to the above embodiments. Alternatively, the antenna structure of the present invention is applicable also to other radio communication devices and portable electronic instruments, such as PDA, wherein a communication card is built in or a hot-swappable communication card is attached thereto as the optional part.

What is claimed is:

1. A radio communication device, comprising:
   upper and lower housings connected by a hinge part so that the upper and lower housings are mutually rotatable around the hinge part;
   a first circuit board provided in the upper housing and carrying first electric components;
   a second circuit board provided in the lower housing and carrying second electric components;
   a connection portion electrically connecting the first circuit board and the second circuit board to each other;
   an antenna provided in the lower housing and having a base, an electric supply terminal and a ground terminal; and
   an antenna electric supply part provided at an end of the second circuit board near the hinge part to supply an operating current from the second circuit board to the antenna,
   wherein the antenna electric supply part in the second circuit board is in a position separated from a central position of the second circuit board in an axial direction of the hinge part to increase a distance from the connection portion along the hinge part, and the electric supply terminal and the ground terminal of the antenna are extended from the base of the antenna in the hinge part axial direction to contact the antenna electric supply part, and
   wherein the antenna is arranged on one surface of the second circuit board carrying the second electric components, and an other surface of the second circuit board is provided the antenna electric supply part.

2. The radio communication device according to claim 1 wherein the antenna is formed of a conductive metal piece, and arranged in an asymmetrical formation with respect to a centerline of the lower housing perpendicular to the axial direction of the hinge part.

3. The radio communication device according to claim 1 wherein the connection portion is formed of a flexible wiring board, and the flexible wiring board having a winding portion wrapped around the hinge part, and being arranged to extend from a back surface of the first circuit board to a front surface of the second circuit board through the winding portion.

4. The radio communication device according to claim 1 wherein the first electric components carried on the first circuit board comprise a display unit, and the second electric components carried on the second circuit board comprises a key operation unit.

5. The radio communication device according to claim 1 wherein a position of the base in the antenna is at a position away from the connection portion in a direction perpendicular to a centerline of the lower housing, and the electric-supply terminal and the ground terminal are extended in the axial direction of the hinge part from the base of the antenna in order to contact the antenna electric-supply portion.

6. The radio communication device according to claim 1 wherein the antenna is arranged apart from a given electric component on the second circuit board.

7. A radio communication device, comprising:
   upper and lower housings connected by a hinge part so that the upper and lower housings are mutually rotatable around the hinge part;
   a first circuit board provided in the upper housing and carrying first electric components;
   a second circuit board provided in the lower housing and carrying second electric components;
   a connection portion electrically connecting the first circuit board and the second circuit board to each other;
   an antenna provided in the lower housing and having a base, an electric supply terminal and a ground terminal; and
   an antenna electric supply part provided at an end of the second circuit board near the hinge part to supply an operating current from the second circuit board to the antenna,
   wherein the antenna electric supply part in the second circuit board is in a position separated from a central position of the second circuit board in an axial direction of the hinge part to increase a distance from the connection portion along the hinge part, and the electric supply terminal and the ground terminal of the antenna are extended from the base of the antenna in the hinge part axial direction to contact the antenna electric supply part, and
   wherein the antenna is connected to the second circuit board through the ground terminal and the electric supply terminal, the ground terminal and the electric supply terminal contacting one surface of the second circuit board carrying the second electric components, and an other surface of the second circuit board is provided the antenna electric supply part.

* * * * *